M. LEITCH.
YIELDABLE BEARING FOR CENTRIFUGAL MACHINES.
APPLICATION FILED JAN. 8, 1919.

1,373,084.

Patented Mar. 29, 1921.

WITNESS:
Rob't R. Kitchel

INVENTOR
Meredith Leitch
BY
Frank S. Busser
ATTORNEY.

M. LEITCH.
YIELDABLE BEARING FOR CENTRIFUGAL MACHINES.
APPLICATION FILED JAN. 8, 1919.

1,373,084.

Patented Mar. 29, 1921.

WITNESS:

INVENTOR
Meredith Leitch
BY Frank S. Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

YIELDABLE BEARING FOR CENTRIFUGAL MACHINES.

1,373,084.

Specification of Letters Patent.   Patented Mar. 29, 1921.

Application filed January 8, 1919.   Serial No. 270,137.

*To all whom it may concern:*

Be it known that I, MEREDITH LEITCH, a citizen of the United States, residing at Poughkeepsie, county of Dutchess, and State of New York, have invented a new and useful Improvement in Yieldable Bearings for Centrifugal Machines, of which the following is a full, clear, and exact description, reference being had to the accompanying drawings, which form a part of this specification.

My invention relates to spring bearings particularly adapted for centrifugal machinery.

In such apparatus as centrifugal liquid separators and clarifiers, which necessarily revolve at high speed and in which it is impossible to always have the center of gravity exactly coincide with the geometrical center, the revolving spindle is provided with a bearing held in the center of the frame by a spring. This spring permits slight movement of the bearing so that the spindle and bowl may revolve about the center of gravity.

To give the best results the spring should have a slight resistance to small movements but a rapidly increasing resistance as the amplitude of the movement increases. With the ordinary springs employed for this purpose the resistance to movement is proportional to the movement.

The object of my invention is to provide a spring bearing in which the rate of increase of resistance to movement shall increase with the movement.

The invention comprises a bearing, a restraining spring inclosing the bearing, and a support inclosing the spring, the support and bearing being so formed and the spring being so anchored and shaped that as the bearing is more and more displaced from its central position the free length of the spring, at the side toward which the bearing moves, will be more and more reduced and thereby offer a more than proportional resistance to further movement.

To illustrate my invention I herein disclose two embodiments of my invention. In the first embodiment the spring is supported at the ends and is loaded at the center, the support being of such form that as the spring yields the points of contact with the support approach the center of the support and the abutment of the load being of such form that as the spring yields the points of contact with the spring will approach the ends, whereby the effective length of spring will be reduced and its resistance increase more rapidly than the movement.

In the second embodiment of the invention flat springs are each supported at one end and provided with an abutment which, when the bearing is in the center of the frame, bears on only the free end of the spring, but which, when the bearing is moved on one side of the center, bears on the spring nearer the anchorage thus, as in the first embodiment, reducing the effective length of the spring, while its resistance increases more rapidly than the movement.

My invention, however, is not restricted to the specific embodiments thereof herein particularly disclosed.

In the accompanying drawings—

Figure 1:
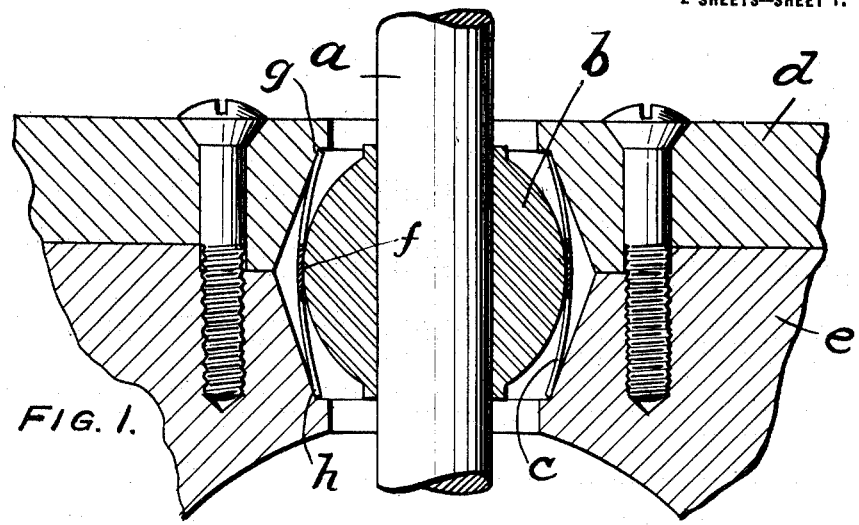
Figure 1 is a vertical sectional view of a spindle, bearing, support and spring embodying one form of my invention, the spindle being shown in a central position, and the spring being shown only in one plane.
Figure 2:
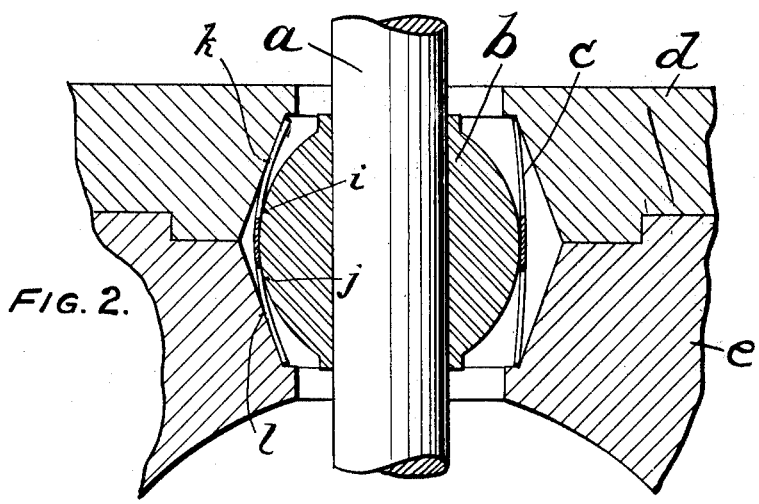
Fig. 2 is a view, similar to Fig. 1, with the spindle at one side of the center.
Figure 3:
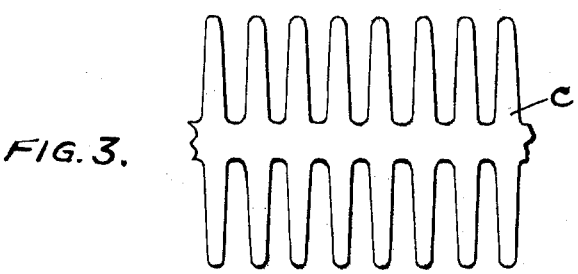
Fig. 3 is a developed view of the spring of Figs. 1 and 2.

Referring first to the embodiment of my invention illustrated in Figs. 1, 2 and 3:

The spindle $a$ of a centrifugal bowl (not shown) is guided on a bearing $b$, laterally restrained by a spring $c$ supported by an abutment composed of two parts $d$ and $e$. The spring is composed of a plurality of flat spring fingers joined together at the center, as shown in Fig. 3, and bent so that when free they collectively form a cylinder. The outside of the bearing is preferably spherical in form. The inside diameter of the abutment or support is smallest at the top and bottom and greatest midway between its top and bottom, the inside surface of the support tapering toward the axis of rotation of the spindle from its mid-circumference toward both its top and bottom.

The spring c is of such length as to surround the bearing when applied thereto. The smaller diameters of the support are less than the outside diameter of the spring when wrapped tightly around the bearing and the spring contacts with the support only along the upper and lower edges of the spring, as at $g$ and $h$. By reason of the shape of the bearing, the spring touches the bearing only along the narrow zone including the mid-circumference of both, as at $f$. This leaves a maximum length of free spring and allows the bearing to be easily moved for a short distance. When the bearing is moved to one side of the center, as shown in Fig. 2, the spring, on the side toward which it moves, is bent around and contacts with the bearing for a greater or less distance on opposite sides of the mid-circumference of both, while at the same time the end portions of the spring, for a greater or less distance, are bent against and contact with the support. Thus, in Fig. 2, if the spindle moves away from the center as far as indicated, the spring contacts with the bearing from $i$ to $j$ and with the support between one end of the spring and $k$ and between the other end of the spring and $l$, leaving, as shown, very short lengths of free spring $i\,k$ and $j\,l$, which will be stiff and offer great resistance to movement. At the same time, the spring, on its opposite side, becomes straighter and causes very little pressure to assist the movement.

To enable the spring to operate as described, the middle diameter of the support $d\,e$ should be greater than the maximum diameter of the bearing plus twice the thickness of the spring, and the end diameters of the support should be less than the maximum diameter of the bearing plus twice the thickness of the spring.

Figure 4:
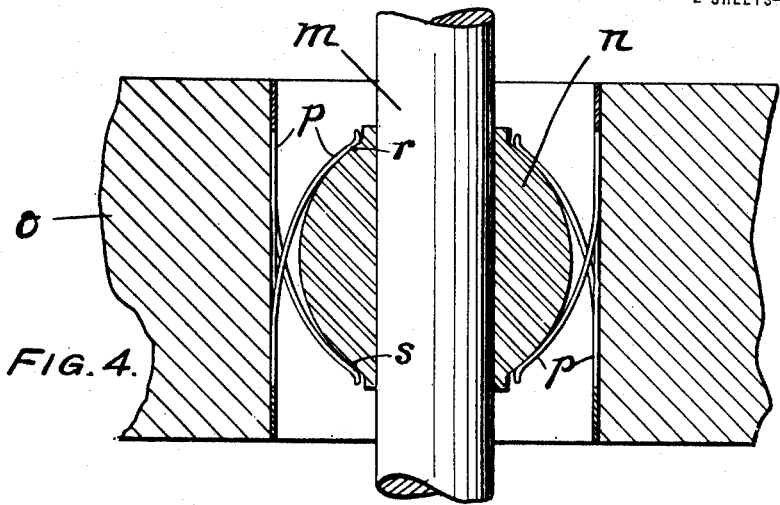
Fig. 4 is a view, similar to Fig. 1, of a modification.
Figure 5:
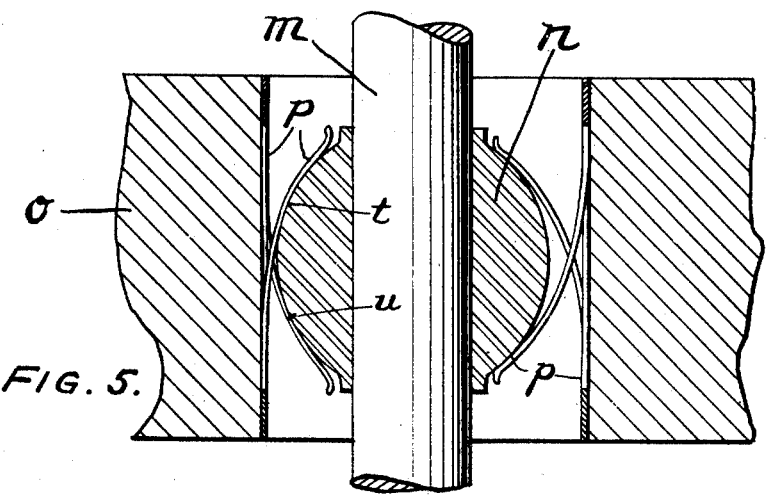
Fig. 5 is a view, similar to Fig. 2, of the modification of Fig. 4.
Figure 6:
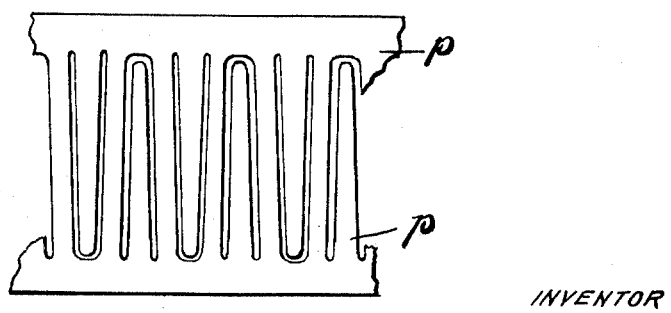
Fig. 6 is a developed view of the spring of Figs. 4 and 5.

In the form shown in Figs. 4, 5 and 6, $m$ represents the spindle, $n$ the bearing and $o$ the support for the spring $p$, which is of the type set forth in Patent No. 1,107,690, issued August 18, 1914, to T. H. Miller, but differing from the specific construction of the patent in that the fingers are bent inward instead of outward and are curved on the arc of a circle instead of irregularly. The spring fingers in this case are attached to a cylinder which fits a cylindrical bore in a machine frame, making them particularly adaptable for use to replace Miller springs in existing machines, of which there are many thousands in use.

With the bearing in the central position, as shown in Fig. 4, the springs $p$ touch the bearing $n$ at only the points $r$ and $s$, leaving a great length of free spring and permitting easy movement of the bearing. When the bearing is forced to one side of the center, the fingers on that side bend and their points of contact with the bearing approach its center, as at $t$ and $u$, leaving relatively short free springs, which will be stiff and offer great resistance to further movement, while the fingers on the opposite side will have only their extreme ends in light contact with the bearing, giving negligible pressure to assist movement.

The restraining force of an ordinary spring may be described by the equation $F=xy$ in which F is the restraining force, $x$ is a constant and $y$ is the displacement from a central position. The restraining force of one of my springs would be represented more nearly by the equation $F=xy^n$ with the exponent $n$ greater than 1.

In Letters Patent No. 1,352,204, issued September 7, 1920 on an application filed of even date herewith, I have shown and described the yieldable bearing illustrated in Figs. 4, 5 and 6. The claims in said patent are applicable to such bearing, but not to the bearing shown and described in Figs. 1, 2 and 3. Herein the novel features common to both bearings are claimed, and certain features embodied in the bearing of Figs. 1, 2 and 3, but not embodied in the bearing of Figs. 4, 5 and 6, are also claimed.

Having now fully described my invention, what I claim and desire to protect by Letters Patent is—

1. A yieldable bearing for a centrifugal machine comprising a bearing having a sphere-like convex surface, a surrounding support, and a spring confined between the bearing and support and extending along the axis of the bearing and having a free end displaceable in the direction of said axis in the lateral movement of the bearing.

2. A yieldable bearing for a centrifugal machine comprising a bearing having a sphere-like convex surface, a surrounding support, and spring fingers extending along the axis of the bearing between said members and having free ends slidable in the direction of said axis along one of said members to reduce the effective length of the spring fingers at the side toward which the bearing moves.

3. A yieldable bearing for a centrifugal machine comprising a bearing having a sphere-like convex surface, a surrounding support, and spring fingers extending along the axis of the bearing between said members, said fingers having free ends and bendable, when the bearing moves toward the support, to increase the contacting part of the length of a finger at the side toward which the bearing moves and thereby reduce the effective lengths of such finger.

4. A yieldable bearing for a centrifugal machine comprising a bearing having a sphere-like convex surface, a surrounding support, and spring fingers confined between the axis and support and extending along the axis of its bearing and having free ends which, in the lateral movement of the bearing, are displaceable, in the direction of the axis, in one direction at the side toward which the bearing moves and in the opposite direction at the side away from which the bearing moves.

5. A yieldable bearing for a centrifugal machine comprising a bearing having a sphere-like convex surface, a surrounding support, and spring fingers confined between the axis and support and extending along the axis of its bearing and having free ends which, in the lateral movement of the bearing, are bendable to increase the contacting part of the length of a finger at the side toward which the bearing moves and decrease the contacting part of the length of a finger at the opposite side and thereby reduce the effective length of the spring at one side and increase its effective length at the opposite side.

6. In a yieldable support for a rotatable spindle, the combination of the spindle, a bearing guiding the spindle, a support surrounding the bearing and spindle, and a spring confined between the bearing and support, said spring comprising spring sections extending along the axis of the spindle between relatively distant points on the bearing and support respectively when the bearing is in a central position, the bearing having a spherical-like surface so that, as it moves laterally, it shortens the effective free length of a spring section at the side toward which the bearing moves.

7. In a yieldable support for a rotatable spindle, the combination of the spindle, a bearing, having a sphere-like surface, guiding the spindle, a support surrounding the bearing whose inner wall, from its mid-circumference, slopes in opposite directions toward the axis of rotation, and a spring, confined between the bearing and support, whose upper and lower portions engage the support and whose central portion engages the sphere-like surface of the bearing.

8. A yieldable bearing comrpising a supporting member having its middle portion larger in diameter than the ends, a bearing having a spherical-like exterior surface, and an intermediate spring, the middle diameter of the support being greater than the maximum diameter of the bearing member plus twice the thickness of the spring and the end diameters of the support being less than the maximum diameter of the bearing plus twice the thickness of the spring.

9. A yieldable bearing for a centrifugal machine, comprising a bearing having a sphere-like convex surface, a surrounding support consisting of two frusto-conical chambers with their bases together and a spring having fingers normally parallel to form a cylinder, the relative shape and sizes of the sphere and chambers being such that, with the bearing in the center, the centers of the spring fingers conform to the curve of the sphere and the ends form curves to which the conical walls are tangent.

10. A yieldable bearing for a centrifugal machine comprising a bearing having a sphere-like convex surface, a surrounding support consisting of two frusto-conical chambers with their bases together and a spring having fingers normally parallel to form a cylinder, the relative shape and sizes of the sphere and chambers being such that, with the bearing in the center, the centers of the spring fingers conform to the curve of the sphere and the ends form curves to which the conical walls are tangent, while displacement of the bearing from the center causes on the side toward which it moves an increase of conformity of the spring to the sphere and an increase of the tangency of the spring to the conical walls.

In testimony of which invention, I have hereunto set my hand, at Poughkeepsie, N. Y., on this 31st day of December, 1918.

MEREDITH LEITCH